US008234654B2

(12) United States Patent
Green et al.

(10) Patent No.: US 8,234,654 B2
(45) Date of Patent: Jul. 31, 2012

(54) LOAD BALANCING USING DISTRIBUTED PRINTING DEVICES

(75) Inventors: Garrett Green, Webster, NY (US); Jehoiada Bernard, Williamson, NY (US)

(73) Assignee: Xerox Corporation, Norwalk, CT (US)

( * ) Notice: Subject to any disclaimer, the term of this patent is extended or adjusted under 35 U.S.C. 154(b) by 954 days.

(21) Appl. No.: 12/254,084

(22) Filed: Oct. 20, 2008

(65) Prior Publication Data
US 2010/0100884 A1    Apr. 22, 2010

(51) Int. Cl.
*G06F 9/50* (2006.01)
(52) U.S. Cl. .................. 718/105; 718/102; 718/104
(58) Field of Classification Search .................. 718/102, 718/104, 105; 358/1.15
See application file for complete search history.

(56) References Cited

U.S. PATENT DOCUMENTS

| 5,903,757 | A  | * | 5/1999 | Gretz et al. ............. 717/127 |
| 6,288,790 | B1 | * | 9/2001 | Yellepeddy et al. ......... 358/1.15 |
| 6,925,431 | B1 |   | 8/2005 | Papaefstathiou |
| 7,016,061 | B1 |   | 3/2006 | Hewitt |
| 7,187,461 | B2 | * | 3/2007 | Schlonski et al. ........... 358/1.15 |
| 7,376,738 | B2 | * | 5/2008 | Snyder ............. 709/226 |
| 7,523,286 | B2 | * | 4/2009 | Ramany et al. ............. 711/170 |
| 7,958,509 | B2 | * | 6/2011 | Aridor et al. ............. 718/104 |
| 2002/0159092 | A1 | * | 10/2002 | Christodoulou et al. .... 358/1.15 |
| 2004/0039815 | A1 | * | 2/2004 | Evans et al. ............. 709/225 |
| 2004/0064354 | A1 | * | 4/2004 | Dietrich et al. ............. 705/9 |
| 2005/0028160 | A1 | * | 2/2005 | Cofer et al. ............. 718/100 |
| 2005/0030574 | A1 | * | 2/2005 | McVey et al. ............. 358/1.14 |
| 2005/0052699 | A1 | * | 3/2005 | Goicoechea ............. 358/1.16 |
| 2005/0091363 | A1 | * | 4/2005 | McCormick et al. ......... 709/224 |
| 2005/0159991 | A1 | * | 7/2005 | Hashuber et al. ............. 705/9 |
| 2005/0216324 | A1 | * | 9/2005 | Maithell et al. ............. 705/8 |
| 2009/0021773 | A1 | * | 1/2009 | Rai ............. 358/1.15 |

FOREIGN PATENT DOCUMENTS

EP    1519594 A2  *  3/2005
JP    2000250726 A  *  9/2000

\* cited by examiner

*Primary Examiner* — Aimee Li
(74) *Attorney, Agent, or Firm* — Fox Rothschild LLP

(57) ABSTRACT

A system and method of distributing workflow in a document processing or other production environment determines a utilization percentage for each of a plurality of printing devices or other resources located in the production environment. For a first printing device, if the utilization percentage associated with the first printing device is below a threshold value, a request may be sent from the first printing device to a workflow distributor to obtain one or more unassigned jobs. If the request for the one or more unassigned jobs sent from the first printing device is received by the workflow distributor, the one or more unassigned jobs may be received at the first printing device.

20 Claims, 3 Drawing Sheets

RESOURCE 1 — 301

| Job Assigned | Time to Complete |
|---|---|
| Print A | 3.2 |
| Print C | 2.6 |
| Print E | 4.15 |
| Print I | 1.35 |
| Print J | 5.2 |
| | |

Total: 16.5

RESOURCE 2 — 302

| Job Assigned | Time to Complete |
|---|---|
| Print B | 5.2 |
| Print D | 8.7 |
| Print F | 7.1 |
| Print G | 11.3 |
| Print H | 4.5 |
| | |

Total: 36.8

FIG. 3

LOAD BALANCING USING DISTRIBUTED PRINTING DEVICES

BACKGROUND

Workflows have commonly been used to provide a structured process for resources in a production environment. A workflow is a process that uses electronic systems to manage and monitor business processes, thus allowing the flow of work between individuals, devices and/or departments to be defined and tracked. A workflow can include the operational aspects of a work process: how tasks are structured, who or what device performs them, the relative order of various tasks, how tasks are synchronized, how information flows to support the tasks and how tasks are being tracked.

A typical workflow in a production environment assigns jobs to printing devices and orders the jobs to achieve an optimization objective, such as minimizing the total turnaround time and ensuring that no jobs are completed later than a defined time. In order to assign the job and monitor the progress of the jobs in a production environment, there is often a central server that communicates with the printing devices. For example, U.S. Pat. No. 7,016,061, the disclosure of which is incorporated herein by reference, discloses a method and system for load balancing across network printers where the entire network is monitored to determine which printer should obtain the next print job. However, this centralized system requires that the server manage the load distribution by determining when each resource is available to be assigned to another job.

As such, improved methods and systems for unmanaged load balancing of distributed work providers would be desirable.

SUMMARY

A method of assigning a job to a printing device in a production environment may include determining a utilization percentage for each of a plurality of printing devices located in a production environment. For a first printing device, if the utilization percentage associated with the first printing device is below a threshold value, a request may be sent from the first printing device to a workflow distributor to obtain one or more unassigned jobs. If the request for the one or more unassigned jobs sent from the first printing device is received by the workflow distributor, the distributor may direct the one or more unassigned jobs to the first printing device.

In one embodiment, determining a utilization percentage may include summing time to complete one or more jobs assigned to the first printing device to yield a sum and dividing the sum by a time period. A utilization percentage may be determined for one or more of the following: CPU utilization, disk input/output, and queue-length. In one embodiment, prior to sending a request, a wait time for the first printing device may be calculated. The wait time may be based on the utilization percentage of the first printing device. The device may wait the calculated wait time before sending the request. In one embodiment, calculating a wait time may include multiplying a percentage of a maximum wait time by the utilization percentage associated with the first printing device. The wait time may include a length of time that the utilization percentage associated with the first printing device will remain below the threshold value before requesting one or more unassigned jobs. In one embodiment, calculating a wait time may include adding a base length wait time to the calculated wait time. The base length wait time may include a time based on network latencies.

In one embodiment, receiving the one or more unassigned jobs at the first printing device may occur only if the request is the first request received by the workflow distributor for the one or more unassigned jobs. In another embodiment, receiving the one or more unassigned jobs at the first printing device may occur only if the workflow distributor has identified an unassigned job when the request is received at the workflow distributor. In an alternate embodiment, receiving the one or more unassigned jobs at the first printing device may occur only if the request has not expired, wherein the request expires after a period of time. In yet another embodiment, receiving the one or more unassigned jobs at the first printing device may occur only if the first printing device is capable of performing the one or more unassigned jobs. In one embodiment, the request may be placed in a queue.

In one embodiment, a system in a document processing environment may include a printing device which determines a utilization percentage, calculates a wait time that is based on the utilization percentage, and sends a request to a workflow distributor to obtain one or more unassigned jobs after waiting the calculated wait time. A workflow distributor may receive the request from the printing device and may send the one or more unassigned jobs to the printing device if the request for the one or more unassigned jobs is the first request received by the workflow distributor.

In one embodiment, the printing device may determine the utilization percentage by summing time to complete one or more jobs assigned to the printing device to yield a sum and dividing the sum by a time period. The printing device may calculate the wait time by multiplying a percentage of a maximum wait time by the utilization percentage. In one embodiment, the printing device may receive the one or more unassigned jobs only if the printing device is capable of performing the one or more unassigned jobs. In an alternate embodiment, the printing device may receive the one or more unassigned jobs only if the request has not expired, wherein the request expires after a period of time.

In one embodiment, a system in a document processing environment may include a resource which determines a utilization percentage, calculates a wait time that is based on the utilization percentage, and may send a request to a workflow distributor to obtain one or more unassigned jobs after waiting the calculated wait time. A workflow distributor may receive the request from the resource and may send the one or more unassigned jobs to the resource if the request for the one or more unassigned jobs is the first request received by the workflow distributor. In one embodiment, the resource may determine the utilization percentage by summing time to complete one or more jobs assigned to the resource to yield a sum and dividing the sum by a time period.

BRIEF DESCRIPTION OF THE DRAWINGS

Aspects, features, benefits and advantages of the present invention will be apparent with regard to the following description and accompanying drawings, of which:

FIG. 3 depicts an exemplary embodiment of resources calculating their utilization percentage based on their assigned jobs according to an embodiment.

DETAILED DESCRIPTION

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural reference unless the context clearly dictates otherwise. Thus, for example, reference to a "document" is a reference to one or more documents and equivalents thereof known to those skilled in the art, and so forth. Unless defined otherwise, all technical and scientific terms used herein have the same meanings as commonly understood by one of ordinary skill in the art. As used herein, the term "comprising" means "including, but not limited to."

The term "job" as used herein refers to the instructions and parameters pursuant to which an item is processed in a production environment. For example, in an assembly line environment, a "job" can refer to the set of materials selected, processes applied, process parameters, machines used, and other data required to determine how a product is produced or otherwise processed on all or part of the assembly line. In a printing environment, a "job" refers to one or more documents to be printed or processed and one or more instructions regarding how to process the documents. Exemplary jobs in a printing environment include, without limitation, assembling a printed periodical or book, putting together a bound presentation, printing and cutting business cards, or the like. In an imaging environment, a "job" refers to one or more documents to be scanned or processed and one or more instructions and/or parameters used to process the documents. In a litigation environment, a "job" refers to one or more documents to be indexed or processed and one or more instructions regarding how to process the documents.

Figure 1:
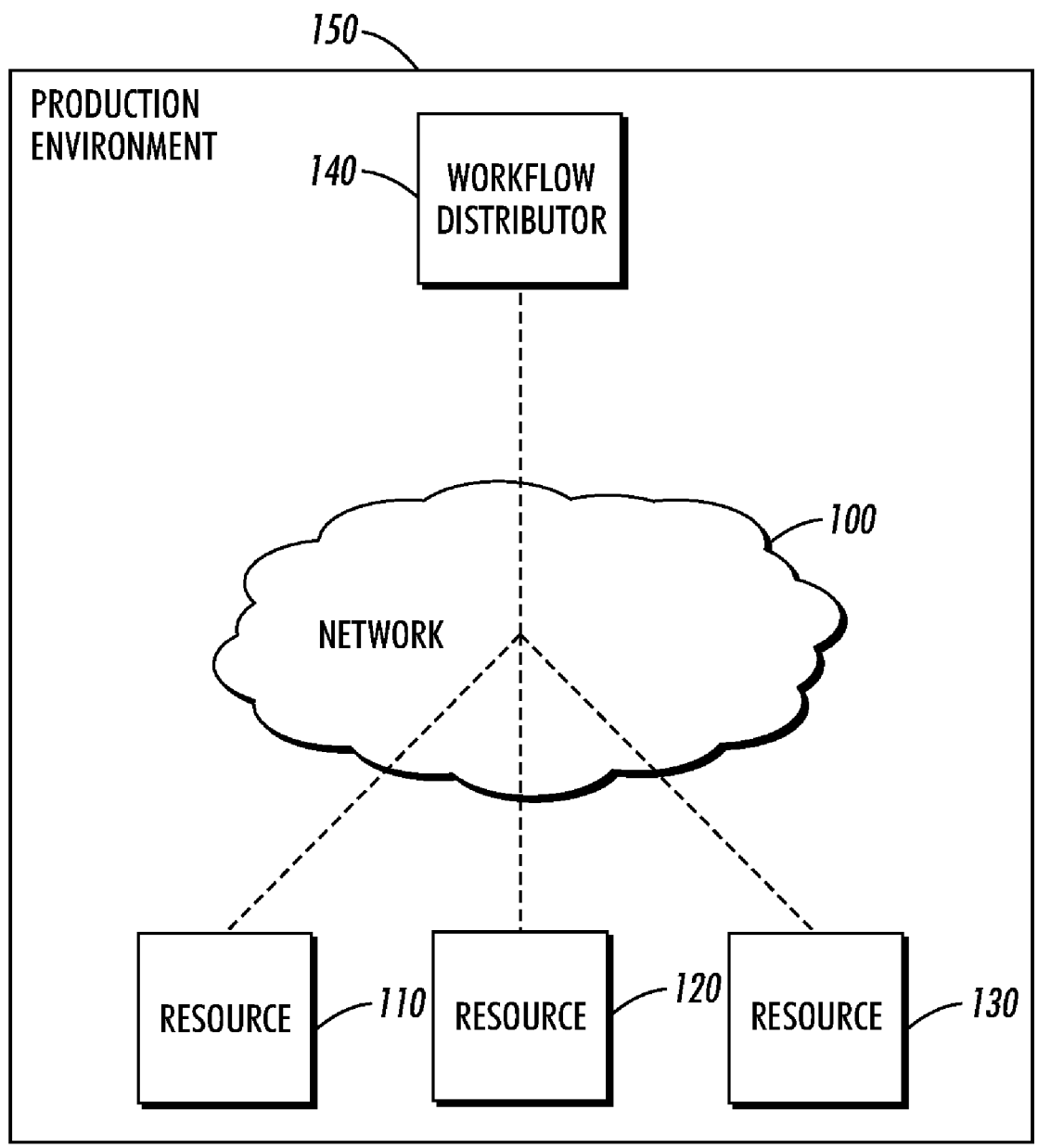
FIG. 1 illustrates exemplary elements of an unmanaged load balancing system according to an embodiment.

FIG. 1 illustrates exemplary elements of an unmanaged load balancing system according to an embodiment. As shown in FIG. 1, the production environment 150 includes a plurality of resources 110, 120, 130. In one embodiment, the resources are interchangeable and are all capable of performing the same function or similar functions. In an alternate embodiment, the resource may have different capabilities. The plurality of resources 110, 120, 130 and the workflow distributor 140 in the production environment 150 support the processing and exchange of electronic information. A resource 110, 120, 130 may include, but is not limited to, a printing device, an imaging device, and/or a kiosk. A printing device is an electronic device that is capable of receiving commands and processing document such as by scanning them or by printing text and/or images on a substrate. Printing devices may include, but are not limited to, printers, copiers, faxes, scanners or other devices using ink or toner. Each resource may be used to process one or more jobs assigned to that resource. Assigned jobs are jobs that the particular resource must complete.

Each resource 110, 120, 130 may participate in a distributed processing environment. Each resource 110, 120, 130 may be capable of operating in a manner that is independent from every other resource, but each resource may communicate with a workflow distributor 140. A workflow distributor is a device or application that identifies and/or obtains unassigned jobs and sends or assigns one or more of those jobs to a particular resource. In one embodiment, the workflow distributor may be embodied on hardware and/or software. In one embodiment, a workflow distributor may be a set of operations within a general control system. The workflow distributor 140 may obtain one or more jobs from a separate device. In one embodiment, the workflow distributor 140 may store the one or more unassigned jobs.

The plurality of resources 110, 120, 130 may be in communication with the workflow distributor 140 via a network 100 such as a local area network (LAN), wide area network (WAN), Internet or another communications network. The resources 110, 120, 130 may, in some embodiments, be connected to the workflow distributor 140 via multiple communication networks. In one embodiment, the resources 110, 120, 130 may be connected to a workflow distributor 140 via a network such as, but not limited to, a universal serial bus (USB) port or outlet, or other wireless or wired device. As used herein, the words "connected" and "connection" refer to devices that are configured for one or more wired and/or wireless networks so that they can pass information to each other through the network.

Figure 2:
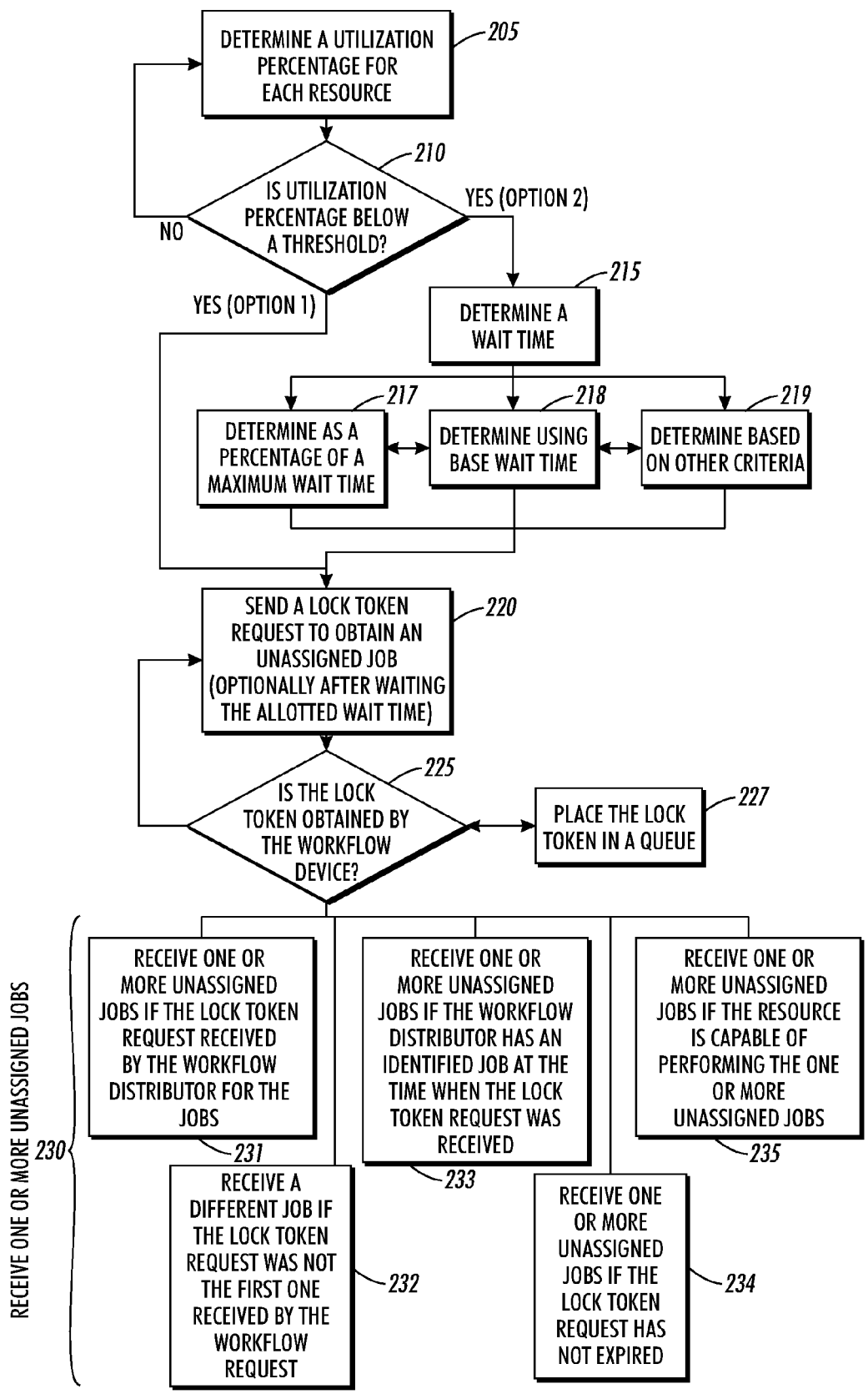
FIG. 2 illustrates a flowchart depicting an exemplary method of unmanaged load balancing using distributing resources according to an embodiment.

FIG. 2 illustrates a flowchart depicting an exemplary method of unmanaged load balancing using distributed resources according to an embodiment. Each resource may include a set of jobs it needs to complete. The jobs may be stored in, but not limited to, a cache, a buffer, a list, a table, a chart or some other grouping which allows the resource to complete one job and then access another job. Each resource includes or is connected to a processor and is programmed to implement a load management system. Each resource's load management system determines a utilization percentage for that resource located in a production environment 205. A utilization percentage is a representation of how much of a time period a resource is occupied completing assigned jobs. In one embodiment, the determination of a utilization percentage may consider factors such as calculating central processing unit utilization, disk input/output, and/or queue-length.

The utilization percentage is based on the number and/or size of assigned jobs that are currently processing and/or still need to be completed by the resource, as well as the resource's capacity and/or processing speed. Each assigned job may have an associated completion time based on the resource. In one embodiment, the time to complete a job may be dependent upon the type of resource. In one embodiment, the utilization percentage may be calculated by dividing the sum of the time to complete the one or more assigned jobs by a time period. In one embodiment, the time period may be, but is not limited to, a predetermined number or a random number. In an alternative embodiment, the time period may be dependent on the production environment or the amount of assigned and/or unassigned jobs.

After a utilization percentage is calculated for a first resource, the first resource may determine if its utilization percentage is below a threshold value 210. The threshold value may be, but is not limited to, a fixed time value, a random value, a calculated value based on the resources, a calculated value based on the number of unassigned jobs and/or various other alternatives. In addition, different resources in a production environment may share common threshold values or their threshold values may differ. If the utilization percentage of the first resource is below a threshold value, the first resource may send a request to the workflow distributor 220.

A request is a command or an advertisement which may be used to obtain a job. Each resource may send one or more requests. However, the workflow distributor may only accept one request per job. Once a request is received, the workflow distributor may release one or more jobs to the resource associated with the accepted request. Therefore, only one resource will obtain a particular job.

In one embodiment, a workflow distributor may determine if the request from the first resource is received for the one or more unassigned jobs 225. If the request sent by the first resource is received by the workflow distributor, the resource may receive the one or more unassigned jobs 230. In one embodiment, after the resource receives the one or more jobs, the resource may add the one or more jobs to its group of assigned jobs to be completed.

In one embodiment, the one or more unassigned jobs may be received by the first resource only if the request is the first request received by the workflow distributor for the one or more unassigned jobs 231. In one embodiment, if the request was not received by the workflow distributor for the particular job 225, the resource may not receive that job and may need to send a request for another job 220. In an alternate embodiment, the workflow distributor may use the request sent by the first resource to assign a different job to that resource 232. In another embodiment, a resource may only receive an unassigned job if the workflow distributor has identified an unassigned job at the time when the request is sent and/or received at the workflow distributor 233.

In one embodiment, the request may expire after a period of time. In one embodiment, the one or more unassigned jobs may be received by the first resource only if the request has not expired 234. In an alternate embodiment, the request may continue indefinitely. If the workflow distributor does not have a job to send to the first resource, the request may be obtained by the workflow device 225 and placed in a queue 227. After one or more unassigned jobs are obtained, the workflow distributor may use the requests in the queue 227 to assign the one or more unassigned jobs to the plurality of resources 230.

In another embodiment, a resource may not be capable of performing all jobs in the workflow distributor. The capability of a resource may be dependent upon the resource's functionality. In one embodiment, the one or more unassigned jobs may be received at the first resource only if the first resource is capable of performing the one or more unassigned jobs 235. If the resource is not capable of performing any of the unassigned jobs, the request may wait for a job which the resource is capable of completing, be placed in a queue, and/or may expire.

FIG. 3 depicts an exemplary embodiment of resources calculating their utilization percentage based on their assigned jobs. According to FIG. 3, Resource1 301 and Resource2 302 are each associated with a list of assigned jobs. Each job assigned to Resource1 301 takes a certain amount of time to complete. For example, the job Print A takes 3.2 minutes to complete, while the job Print J takes 5.2 minutes to complete. In order to determine the total utilization percentage, the time to complete all the jobs assigned to the resource must be calculated. The total time to complete all the jobs for Resource1 301 would be the sum of 3.2+2.6+4.15+1.35+5.2 minutes. Therefore, the total time to complete all the jobs for Resource1 301 is 16.5 minutes. The total time to complete all the jobs for Resource2 302 is 36.8 minutes. To determine the utilization percentage for a resource, the total time to complete all the jobs to be performed by that resource may be divided by a time period. The time period may be a predetermined length of time. In one embodiment, the time period may be one hour (60 minutes). Therefore, the utilization percentage for Resource1 301 may be 16.5/60 or 28% and the utilization percentage for Resource2 302 may be 36.8/60 or 61%.

Therefore, if the threshold value is 50%, then Resource1 301 may be below the threshold value as Resource1 301 only has a utilization percentage of 28%. However, Resource2 302 has a utilization percentage of 61% and thus Resource2 302 would remain above the threshold.

Referring back to FIG. 2, if the utilization percentage is not below the threshold value, then the resource may wait to send a request until the resource has a utilization percentage that is less than the threshold value 205. A resource may recalculate its utilization percentage after every job, after every couple jobs, after a certain period of time, at set intervals, randomly, or other periods.

If the utilization percentage of the first resource is below the threshold value, the first resource may calculate a wait time 215. A wait time is the length of time a first resource will remain below the threshold value before requesting a job. In some embodiments, multiple utilization thresholds may permit delivery of a request, but the higher the utilization percentage, the longer the wait time. By using a wait time before sending a request 220, the system may allow less busy resources, or resources with lower utilization percentages, to more easily obtain one or more unassigned jobs.

In one embodiment, a wait time may be determined as a percentage of a maximum wait time 217 or otherwise limited to a maximum wait time. For example, the maximum wait time could be the predetermined value of 10 minutes. In FIG. 3, Resource1 301 has a utilization percentage of 28%. Therefore, if the wait time is determined by the utilization percentage (28%) times the maximum wait time (10 minutes), Resource1 301 would have a wait time of 2.8 minutes.

Each resource may have a different maximum wait time or the maximum wait time may be the same for all resources. The maximum wait time, when used, may be a predetermined number or a random number.

Referring back to FIG. 2, in one embodiment, the wait time 218 may be determined using a base wait time in addition to, or instead of, using the utilization percentage to determine the wait time. The base wait time is a predetermined amount of time that each resource will wait. The base time may be based on network latencies and therefore may differ among resources. For example, there may be two resources, resource A and resource B, which obtain jobs from the workflow distributor. However, resource A may obtain information from the workflow distributor at a faster rate than resource B obtains information from the workflow distributor. Therefore, resource A may have a higher base wait time than resource B to account for the network latencies.

In an alternate embodiment, the wait time may be dependent upon other criteria 219. For example, the wait time may be determined by, but is not limited to, the minimum wait time, the number of unassigned jobs, the number of assigned jobs, the number of resources below the threshold value and/or other criteria.

After waiting the calculated wait time, the first resource may send a request to a workflow distributor to obtain one or more unassigned jobs 220. The wait time, along with the threshold value, allows the system to respond to specific needs of the resources. For example, a resource may need more jobs and therefore may have a lower threshold value to receive more jobs. In another example, a resource may be added to the system without reprogramming the workflow distributor. When a resource is added to the system, the resource will receive one or more jobs once the workflow distributor receives a request from that resource. Similarly, when a resource is replaced or removed, the workflow distributor does not need to be reprogrammed. The removed resource will not obtain jobs as the workflow distributor will not receive requests from that resource. If the old resource was replaced by a new resource, the new resource will begin receiving jobs once the new resource sends a request to the workflow distributor.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of assigning a job to a printing device in a production environment, the method comprising:
    determining a utilization percentage for each of a plurality of printing devices located in a production environment; and
    for a first printing device, if the utilization percentage associated with the first printing device is below a threshold value:
        receiving, by a workflow distributor, a request from the first printing device to a workflow distributor to obtain one or more unassigned jobs, and
        if the request for the one or more unassigned jobs sent from the first printing device is received by the workflow distributor, directing, by the workflow distributor, the one or more unassigned jobs to the first printing device.

2. The method of claim 1 wherein determining a utilization percentage comprises:
    summing time to complete one or more jobs assigned to the first printing device to yield a sum; and
    dividing the sum by a time period.

3. The method of claim 1 wherein determining a utilization percentage comprises:
    determining a utilization percentage of one or more of the following: CPU utilization, disk input/output, and queue-length.

4. The method of claim 1 wherein, prior to sending a request, the method further comprises:
    calculating a wait time for the first printing device, wherein the wait time is based on the utilization percentage of the first printing device; and
    waiting the calculated wait time before sending the request.

5. The method of claim 4 wherein calculating a wait time comprises:
    multiplying a percentage of a maximum wait time by the utilization percentage associated with the first printing device.

6. The method of claim 4 wherein the wait time comprises a length of time that the utilization percentage associated with the first printing device will remain below the threshold value before requesting one or more unassigned jobs.

7. The method of claim 4 wherein calculating a wait time comprises:
    adding a base length wait time to the calculated wait time.

8. The method of claim 7 wherein the base length wait time comprises a time based on network latencies.

9. The method of claim 1 wherein receiving the one or more unassigned jobs at the first printing device occurs only if the request from the first printing device is the first request received by the workflow distributor for the one or more unassigned jobs.

10. The method of claim 1 wherein receiving the one or more unassigned jobs at the first printing device occurs only if the workflow distributor has identified an unassigned job when the request is received at the workflow distributor.

11. The method of claim 1 wherein receiving the one or more unassigned jobs at the first printing device occurs only if the request has not expired, wherein the request expires after a period of time.

12. The method of claim 1 wherein receiving the one or more unassigned jobs at the first printing device occurs only if the first printing device is capable of performing the one or more unassigned jobs.

13. The method of claim 1 further comprising:
    placing the request in a queue.

14. A system in a document processing environment comprising:
    a printing device which determines a utilization percentage, calculates a wait time that is based on the utilization percentage, and sends a request to obtain one or more unassigned jobs after waiting the calculated wait time; and
    a workflow distributor which receives the request from the printing device and sends the one or more unassigned jobs to the printing device if the request for the one or more unassigned jobs is the first request received by the workflow distributor.

15. The system of claim 14 wherein the printing device determines the utilization percentage by summing time to complete one or more jobs assigned to the printing device to yield a sum and dividing the sum by a time period.

16. The system of claim 14 wherein the printing device calculates the wait time by multiplying a percentage of a maximum wait time by the utilization percentage.

17. The system of claim 14 wherein the printing device receives the one or more unassigned jobs only if the printing device is capable of performing the one or more unassigned jobs.

18. The system of claim 14 wherein the printing device receives the one or more unassigned jobs only if the request has not expired, wherein the request expires after a period of time.

19. A system in a production environment comprising:
    a plurality of resources, each of which is capable of performing a job in a production environment, wherein each resource determines a utilization percentage, calculates a wait time that is based on the utilization percentage, and sends a request to obtain one or more unassigned jobs after waiting the calculated wait time; and
    a workflow distributor which receives the request from the resource and sends the one or more unassigned jobs to the resource if the request for the one or more unassigned jobs is the first request received by the workflow distributor.

20. The system of claim 19 wherein the resource determines the utilization percentage by summing time to complete one or more jobs assigned to the resource to yield a sum and dividing the sum by a time period.

* * * * *